Figure 6:
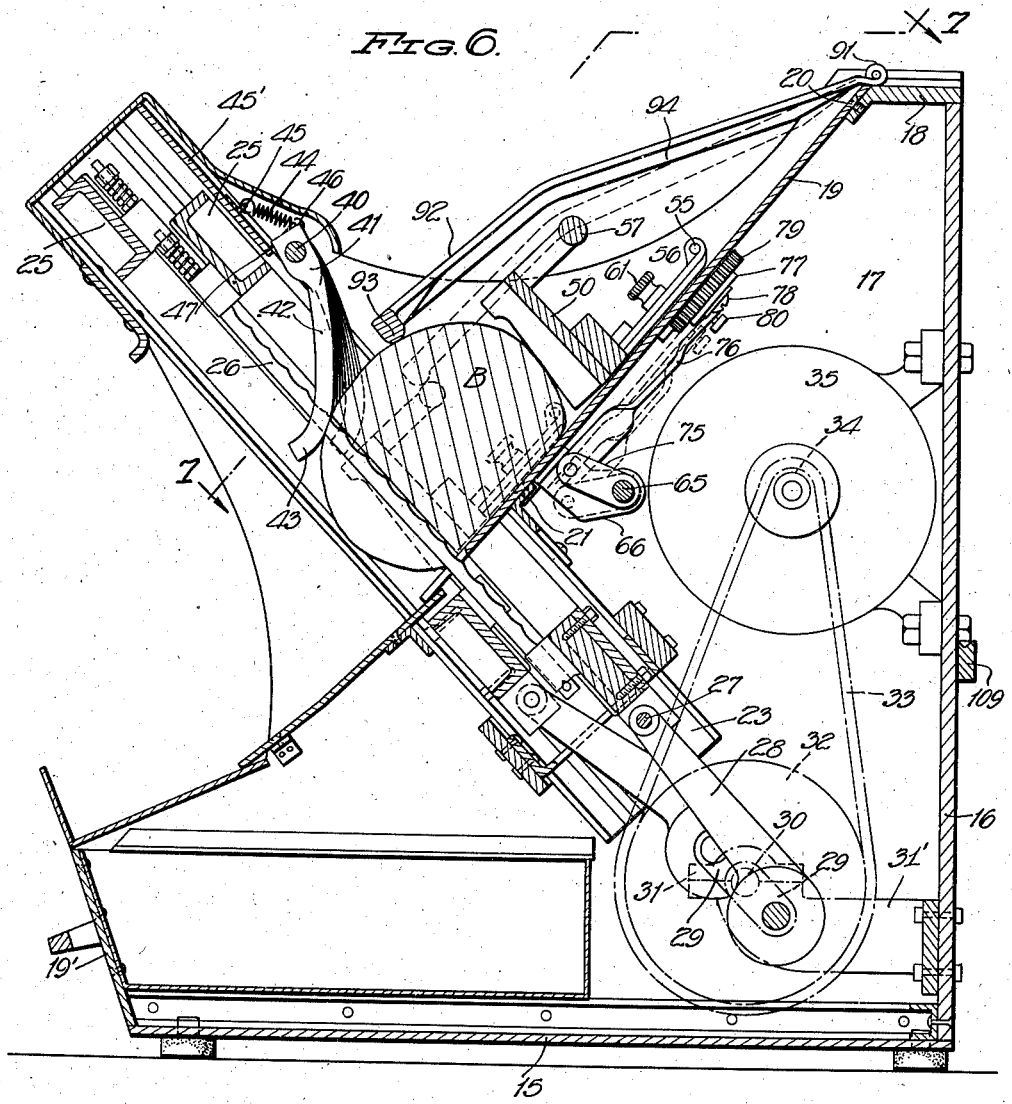

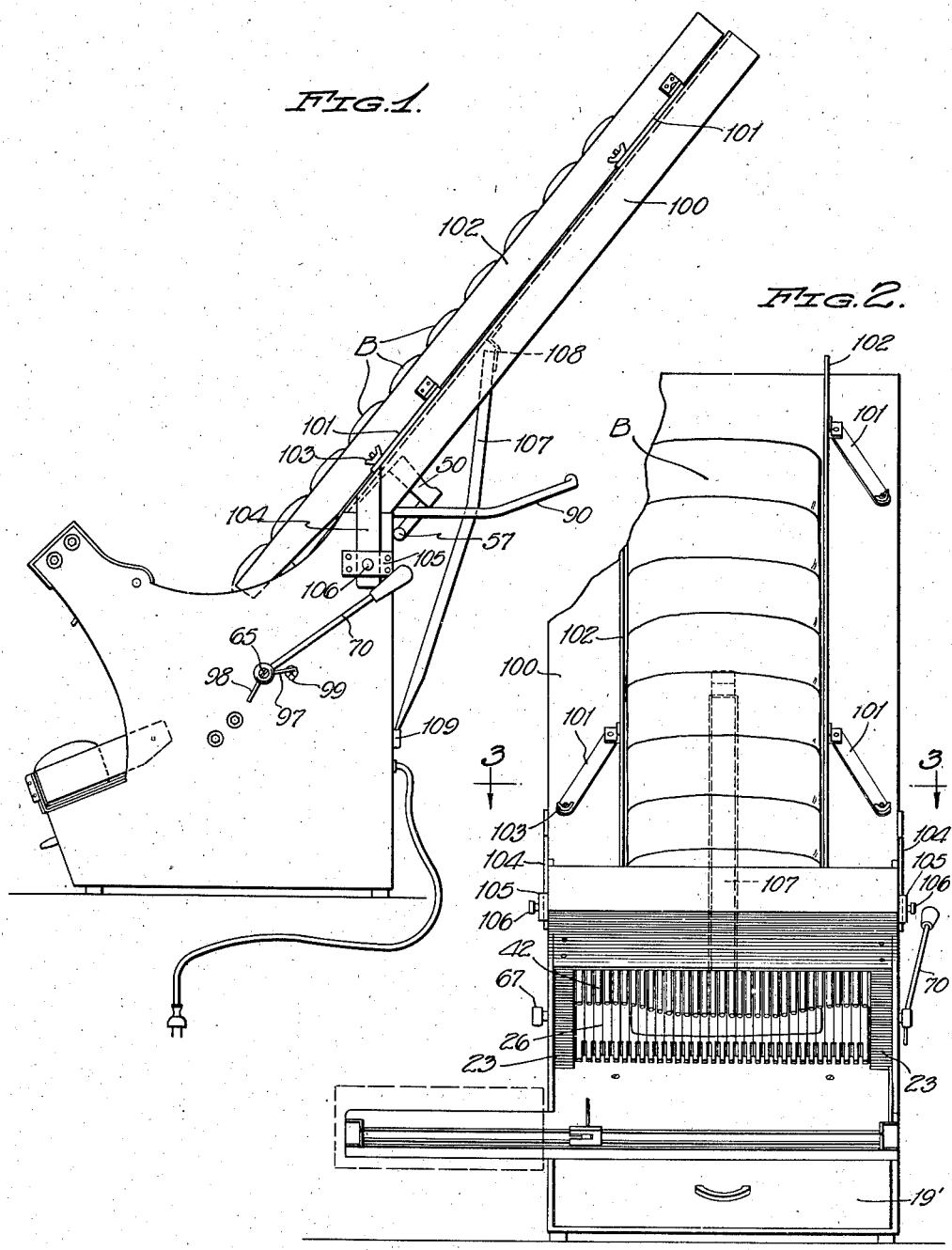

April 21, 1942. M. BRUSTOWSKY 2,280,059
BREAD SLICING MACHINE
Filed March 28, 1939 4 Sheets-Sheet 2
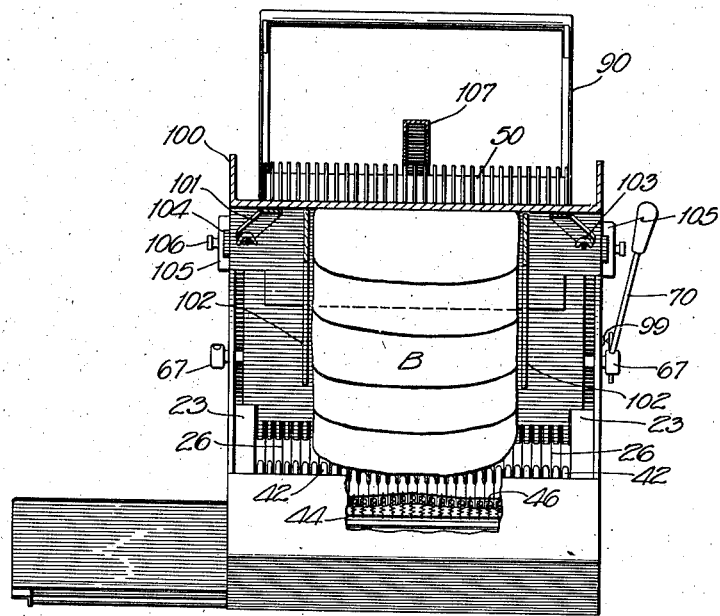
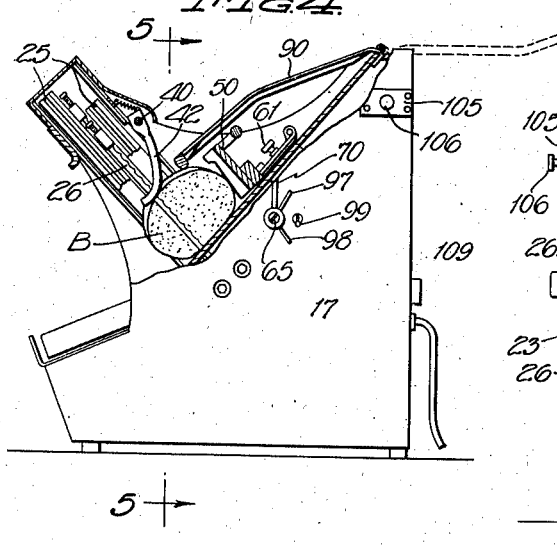
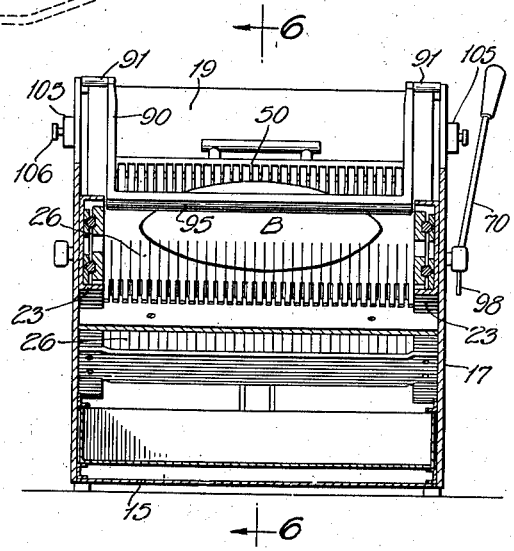
MORRIS BRUSTOWSKY.
INVENTOR April 21, 1942. M. BRUSTOWSKY 2,280,059
BREAD SLICING MACHINE
Filed March 28, 1939 4 Sheets-Sheet 3

WITNESS:

MORRIS BRUSTOWSKY.
INVENTOR
BY Ely Pattison.
ATTORNEYS

April 21, 1942.  M. BRUSTOWSKY  2,280,059
BREAD SLICING MACHINE
Filed March 28, 1939  4 Sheets-Sheet 4

MORRIS BRUSTOWSKY.
INVENTOR
BY Ely Pattison
ATTORNEYS.

Patented Apr. 21, 1942

2,280,059

UNITED STATES PATENT OFFICE 2,280,059

BREAD SLICING MACHINE

Morris Brustowsky, Brooklyn, N. Y., assignor to U. S. Slicing Machine Company, La Porte, Ind., a corporation of Indiana Application March 28, 1939, Serial No. 264,541

8 Claims. (Cl. 146—158)

This invention relates to new and useful improvements in bread slicing machines and while the improvements herein set forth are applicable to practically all types of bread slicing machines, they particularly lend themselves to that type of machine which employs cutting elements in the form of reciprocating knives.

In the reciprocating knife type of machine, the actual cutting elements are in the form of relatively thin, narrow blades with cutting teeth formed upon one edge thereof. These knives are generally disposed in sets or gangs of which there are generally two. In operation, the two sets or gangs of knives are simultaneously operated in opposite directions and a loaf of bread is passed through these knives which sever it into slices or sections.

The knives are usually mounted in spaced relation under tension in frames and suitable means is employed to reciprocate these frames thereby to impart cutting motion to the knives.

Although, as above stated, the knives are secured in their frames under tension, in actual practice, there is a decided tendency to distortion of the knives during the cutting operation, especially at the moment when they are initially engaged by the loaf.

Distortion of the knives of course varies with the character of the bread being cut and while it may not be present to an appreciable degree in a so-called soft loaf, in the case of so-called hard loaves, that is loaves having a hard crust, this distortion of the knives is present to a marked degree and often results in breaking of a knife.

Breaking of the knife is dangerous since it may result in serious injury to the operator and further, small portions or fragments of a broken knife may lodge in a slice of the cut loaf and may cause serious injury to a person who would, in eating such a slice of bread, take into his mouth a small portion of a broken blade.

Further, distortion of one or more of the blades, even though not sufficient to cause breaking thereof, will almost invariably damage the loaf to such an extent as to render it unsalable.

I am aware that devices have been employed between the knives in an attempt to prevent distortion thereof during the cutting operation and while these previously employed devices are, to a certain extent effective when the knives are operating upon loaves of rectangular cross-sectional shape and known as square loaves, they are not always effective when operating upon loaves of irregular cross-sectional shapes, such for example, as round loaves, or oval loaves having reduced or pointed ends.

Distortion of the knives generally results at the time of initial engagement of the knives with the loaf and as generally constructed, the guards are movable simultaneously into position between the knives, rather than independently, the guards do not, particularly in the case of loaves having pointed ends, engage the knives at a point sufficiently close to the point of contact of the knife with the loaf, to prevent distortion of the knives at these points.

The present invention contemplates a plurality of independently pivoted guard fingers which are yieldingly mounted and which are movable to positions between the cutting knives by the loaf of bread being operated upon. By individually mounting the guard fingers and operating them by the loaf, the guard fingers are permitted to conform to the contour of irregular loaves and thus each guard finger engages its respective knives at a point closely adjacent that point where the cutting action takes place, which has been found in actual practice, to prevent distortion of the knives.

It is therefore one object of the present invention to provide a novel form of guard fingers for the knives of bread slicing machines as well as a novel method of operation thereof.

Another object of the invention is to provide novel means for feeding a loaf of bread to be cut, to the cutting mechanism or knives.

Still a further object of the invention is to provide a novel means for holding a loaf relatively to the cutting mechanism during the cutting operation.

Still a further object of the invention resides in a novel arrangement of parts whereby when the loaf feeding means is returned to its initial position, the loaf holding means will be automatically moved out of position where it interferes with the placement of a loaf to be cut.

A still further object of the invention resides in a novel construction and arrangement of parts whereby the machine may be employed either to cut a single loaf at each operation, or it may be employed to operate continuously upon a plurality of loaves of bread as they are fed successively to the machine.

A still further object of the invention is to provide for the automatic starting and stopping of the machine when operating upon a single loaf.

Other objects of the invention reside in certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

Figure 10:
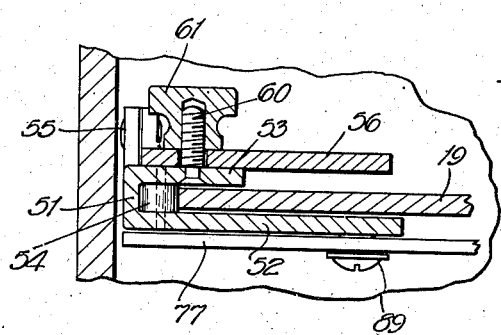
Figure 7:
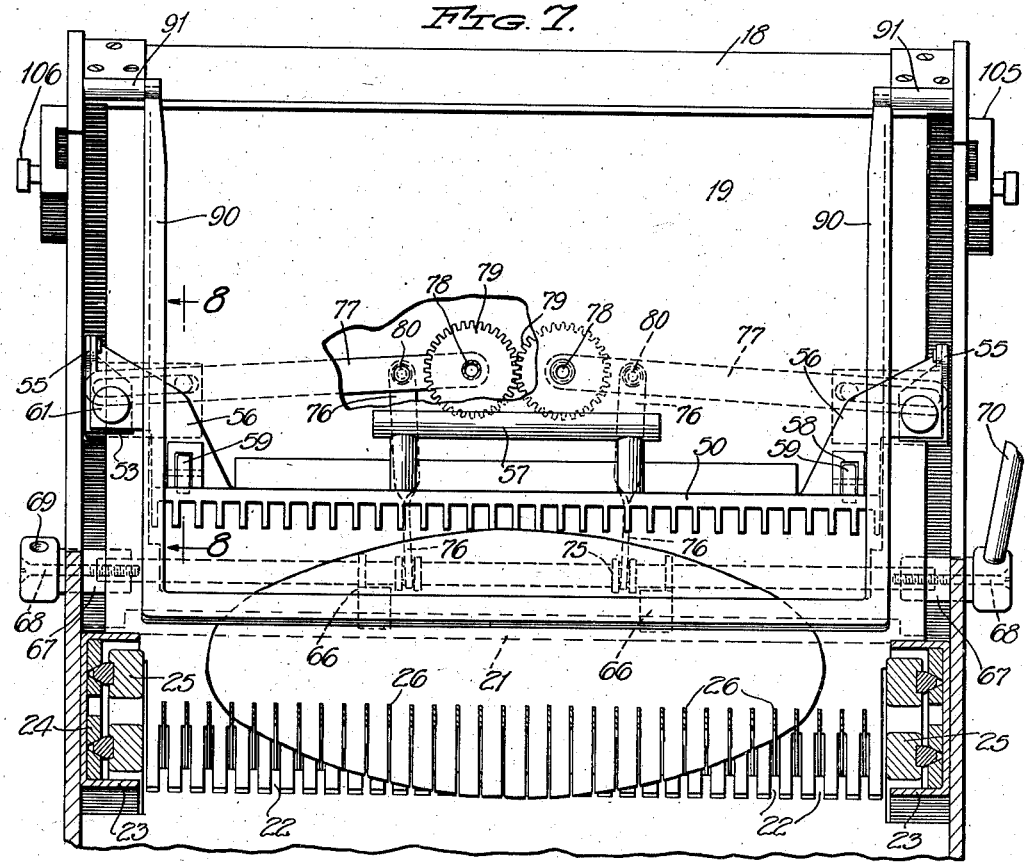
Figures 8, 9:
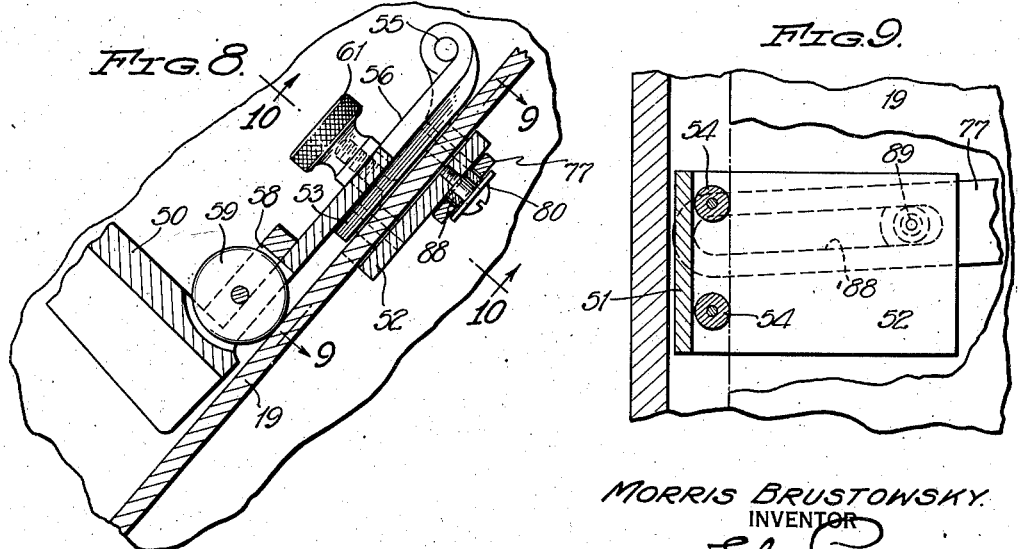

In the drawings:

Figure 1 is a view in side elevation showing a machine constructed in accordance with the present invention, illustrating the arrangement of parts to adapt the machine for successive operation upon a plurality of loaves of bread, Figure 2 is a view in front elevation thereof, the figure being partly broken away, Figure 3 is a top plan view thereof, Figure 4 is a view in side elevation on a reduced scale illustrating the arrangement of parts to adapt the machine to the cutting of a single loaf at each operation thereof, Figure 5 is a vertical sectional view taken substantially on the line 5—5 of Figure 4, Figure 6 is a vertical sectional view on an enlarged scale taken substantially on the line 6—6 of Figure 5, Figure 7 is a horizontal sectional view on an enlarged scale, the view being taken substantially on the line 7—7 of Figure 6, Figure 8 is a detail sectional view on an enlarged scale taken substantially on the line 8—8 of Figure 7, Figure 9 is a detail sectional view taken substantially on the line 9—9 of Figure 8, and;

Figure 10 is a detail sectional view taken substantially on the line 10—10 of Figure 8.

As best illustrated in Figure 6, a machine constructed in accordance with the present invention includes a housing which comprises a bottom wall 15, a front wall 16, side walls 17, a top wall 18 and a relatively low rear wall 19', this latter wall being preferably slightly inclined as shown in said figure. Extending downwardly from the rear edge of the top wall 18, there is a plate or the like 19. This plate 19 is rigidly held in position by securing its upper end as at 20 to the top wall 18, the plate being supported near its lower end by a suitable support 21 herein illustrated as an angle-iron extending transversely of the machine. The lower edge of this plate 19 is provided with a series of notches or the like 22, the purpose of which will be hereinafter more specifically described.

Extending rearwardly of the machine at each side thereof and suitably secured to the side walls 17, there is a channel member 23 and in each of the channel members 23, there are two sets of guideways 24. The channel members 23 are disposed at substantially a forty-five degree (45°) angle to the bottom wall and the guideways carried thereby form tracks upon which the knife frames 25 are reciprocatingly mounted. There are two knife frames 25 and the knives 26 which are carried thereby extend across their respective frames from one side to the other thereof.

The foregoing construction provides two groups of knives which groups are, during operation of the machine, moved simultaneously in opposite directions by a suitable driving mechanism which operates to reciprocate the frames in opposite directions and it is to be understood that the parts thus far described are so proportioned and arranged that the several knives 26 will occupy positions in their respective notches 22 in the plate 19.

By reference to Figure 6, it will be noted that each knife frame 25 has pivotally connected thereto, as at 27, a driving rod or link 28. These driving rods or links 28 are pivotally connected to cranks 29 arranged or disposed one hundred eighty degrees (180°) apart upon a shaft 30, rotatably mounted in bearings carried by suitable arms 31' which project rearwardly from the front wall 16 of the housing. By these means, the driving rods or links 28 are operated to reciprocate their respective knife frames when the shaft 30 is rotated. Operatively connected to the shaft 30, there is a sprocket 32 around which passes a driving chain 33 which also passes around the driving pulley 34 of an electric motor 35 mounted upon the front wall of the housing. When the motor 35 is set in operation, the shaft 30 will be driven through the medium of the sprocket 32 and the chain 33.

In so far as the present machine has been described, it is more or less conventional type and construction and its specific details form no part of the present invention.

Bread slicing machines of the general type herein illustrated have certain undesirable features and defects in their operation and as above stated, it is an object of this invention to overcome such objectionable features and I will now describe the improved constructions and mechanisms by which the afore-mentioned difficulties are overcome.

The plate 19 provides supporting means for the loaf during the cutting operation and as illustrated, this plate 19 is inclined in order that a loaf may move therealong into operative engagement with the knives 26.

Extending transversely of the machine, there is a rod 40 and this rod 40 provides means by which a plurality of knife guards or fingers 41 may be pivotally mounted for movement to and from position between the knives 26. Each of the guards or fingers 41 has a main body portion 42 which terminates in a curved free end 43 and these guards or fingers are so mounted as to extend downwardly from the rod 40 to such an extent that their curved free ends 43 will be in the path of travel of a loaf of bread as it passes through the knives to be cut into slices or sections. The guards or fingers 41 are of such shape and size as to pass freely between the knives and yet when they are in position between the knives, they will practically fill said space, although it is preferred that they be not of sufficient size to engage the knives when the same are in proper cutting position.

The guards or fingers 41 are each independent of the others in their pivotal movement relative to the knives and in their normal position, that is when there is no loaf of bread in the machine, they occupy positions in alinement with each other in the plane indicated by dash lines in Figure 6. By reference to said Figure 6, it will be noted, therefore, that the normal inoperative position of the several guards or fingers 41 is a position in which their curved free ends project between the knives but not to a point beyond the rear edges thereof. To return the several guards or fingers to their normal position, each is provided with a coil spring 44, one end of which is attached to a housing as at 45, which encloses the upper portions of the knife frames the other end being attached to the guards or fingers as at 46.

The housing is extended as at 47 to a point where it is engaged by the pivoted ends of the guards or fingers 41 to provide a stop for the pivotal movement thereof under the influence of their respective springs 44 and these parts are so arranged and proportioned that under the influence of their respective springs 44, each of the guards or fingers 41 will occupy the position indicated by dash lines in Figure 6.

As heretofore stated, in their normal position the curved free ends of the guards or fingers extend to positions in the path of a loaf of bread as it passes through the cutting knives. As illustrated in Figure 6 in which the loaf of bread is designated B, the loaf in passing between the knives engages the guards or fingers 41, pushing them singly between the knives as the loaf of bread progresses. It will also be noted from said figure that the curved free ends of the several guards or fingers engage the loaf at approximately the points at which the cutting actually takes place and by reason of the pressure exerted upon the loaf by the placing of the springs 44 under tension, these several guards or fingers, in addition to preventing twisting or distortion of the knives, serve to a certain extent, to retain the loaf upon the loaf supporting means 19.

By reason of the fact that the several guards or fingers 41 are capable of movement independently of one another, they will at all times engage the loaf being operated upon and perform their functions, above described, regardless of any irregularities in the contour of the loaf or of the cross sectional shape thereof. This feature of the invention, I consider highly important since it insures the several guards or fingers passing into proper position relatively to the knives at substantially the points where the cutting blades engage the loaf which points as above stated, are those at which distortion or twisting of the blades results.

As the cutting of the loaf continues, the loaf passes beneath the several guards or fingers 41 and as it passes clear of the knives, the several guards or fingers 41 are returned to their normal position under the influence of their respective springs 44.

Means is provided to feed the loaf through the knives without necessitating the pushing of the loaf therethrough by an operator. This means consists of a gravity actuated device herein illustrated as a follower 50 which moves along the loaf supporting means 19 under the influence of gravity to force the loaf through the knives 26 in the manner illustrated in Figure 6.

This follower extends substantially across the loaf supporting means 19 upon which it is both pivotally and slidably mounted in a manner which will be hereinafter described.

Mounted at each side of the loaf supporting means 19 (Fig. 10), there is a sliding guide 51 and it is upon these guides that the follower 50 is mounted for sliding movement relatively to the loaf supporting means 19. Since these guides are of substantially identical construction, the description of one is deemed sufficient.

Each of these guides consists of a U-shaped member having a long leg 52 which underlies the loaf supporting means 19 and a relatively short leg 53 which overlies the loaf supporting means 19 as best illustrated in Figure 10. Rollers 54 are carried by the guides and are adapted to engage their respective side edges of the loaf supporting means 19 to facilitate the sliding movement of the guides relative thereto.

Each guide has an upstanding ear 55 and the follower has two rigid arms 56, see Figure 7, by which the follower is pivotally mounted upon the guides. By this construction, the follower forms the connection between the guides 51 and the guides 51 provide the means by which the follower is both slidably and pivotally mounted upon the loaf supporting means 19. The follower 50 has a handle 57 by which it may be swung about its pivotal points for a purpose to be hereinafter described.

Each of the rigid arms 56 is cut out as at 58 and mounted in each cut out portion, there is a roller 59. These rollers 59 support the follower 50 slightly above the loaf supporting means 19 as best illustrated in Figure 8 of the drawings.

Means is provided to retain the follower against pivotal movement and this means is herein illustrated as a bolt 60 carried by the short leg 53 of each of the guides 51. Each bolt 60 extends through an elongated slot in its respective arm 56 and has its upper end threaded to receive a nut 61. When the nuts are tightened upon their respective bolts, the arms are clamped against their respective short legs 53 of the guides and pivotal movement of the follower is thus prevented.

While the follower 50 may be moved by the handle 57, means is also provided for moving said follower from a point removed with respect to the knives 26 and without danger of injury to the hands of the operator.

Extending across the machine, beneath the loaf supporting means 19, there is a shaft 65 which is mounted in two brackets 66 which depend from the under side of the loaf supporting means 19. The shaft 65 terminates short of the side walls 17 of the housing and its ends are supported by removable end bearings 67 which extend through suitable openings in the side walls 17 and are secured to the shaft 65 by bolts or the like 68. Each end bearing 67 has a recess or socket 69 for the reception of a handle 70, which may be placed at either end of the shaft to operate the same from either side of the machine.

The handle provides means for rocking the shaft 65 and I will now describe the mechanism by which the follower will be moved along the loaf supporting means 19 when the shaft 65 is rocked by the handle 70.

Rigidly connected to the shaft 65 and slidably spaced with respect to its longitudinal center there are two levers or cranks 75. Pivotally connected to each of these cranks 75, there is a link 76 and each link 76 is pivotally connected to a lever 77 which levers extend transversely of the machine. Each lever 77 is pivotally connected to the loaf supporting means 19 as at 78 and rotatably mounted upon the inner end of each of these levers, there is a gear 79. The pivotal connection between the links 76 and the levers 77 is designated 80 and it will be noted by reference to Figure 7 that the gears 79 have intermeshing engagement with each other. The outer end of each lever 77 is provided with an elongated slot 88 best illustrated in Figure 9, and this slot embraces a roller 89 mounted upon the under face of the long leg 52 of its respective guide 51. This construction is best illustrated in Figure 8 of the drawings.

It will be apparent that as the shaft 65 is rocked by means of the handle 70, the levers 77 will, through the medium of the links 76, be rocked about their pivotal points 78. This rocking of the levers causes the outer ends thereof to move their respective guides 51 along their respective edges of the loaf supporting means 19. Since, as above stated, the follower is mounted upon the guides 51 the follower will move with the guides. For example, with the parts disposed as illustrated in Figures 6 and 7, if the handle 70 be moved to rock the shaft 65 in a clockwise direction, the outer ends of the levers 77 will be moved upwardly in Figure 7 and will carry the guides of the follower upwardly of the loaf supporting means 19. This action takes place each time a loaf is placed in the machine for operation.

Means is provided to exert sufficient pressure upon the loaf to prevent its rocking under the influence of the knives during a cutting operation and this means will now be described.

The reference numeral 90 designates a bail-like member which is pivotally mounted in bearings 91 upon the upper wall 18 of the housing. Each leg of this bail-like member 90 has an off-set portion 92 and the base 93 of the bail-like member is adapted to rest upon the loaf during the cutting operation as illustrated in Figure 6 of the drawings. Provision of the off-set portion 92 provides a cam portion 94 in each leg of the bail-like member and the purpose of this cam portion will now be described. When the loaf has been completely cut and passes from beneath the bail-like member 90, the bail-like member will settle to position at rest upon the top edge of the follower 50 as illustrated in dash lines in Figure 6. By this construction, it will be apparent that as the follower 50 is moved upwardly of the loaf supporting means 19 in the manner heretofore described, the top edge of the follower will act upon the cam portions 94 of the bail-like member 90 to elevate the same and hold it in such position that a loaf of bread to be cut may be placed upon the loaf supporting means 19 in position between the follower 50 and the knives 26. If now the handle 70 be released, the follower will, under the influence of gravity, move downwardly of the loaf supporting means 19 and force the loaf of bread being operated upon through the cutting knives 26 to perform the cutting operation.

The machine is preferably operated by an electric motor 35 and when operating upon single loaves at intermittent intervals, it is desirable to cut off the power to said motor 35. This is accomplished automatically by means of two arms 97 and 98 which are carried by the shaft 65 as illustrated in Figure 4. These arms are so arranged as to operate a snap switch 99 in the circuit of the motor 35. By reference to Figure 4, it will be apparent that as the handle 70 is rocked in a clockwise direction in said figure to move the follower 50 upwardly of the loaf supporting means 19, the arm 97 will engage the snap switch 99 to close the circuit to the motor to set it in operation. As the loaf is fed through the knives the shaft 65 will be rotated by the follower in a counter-clockwise direction and as the cutting operation is completed, the arm 98 will engage the snap switch 99 to open the circuit to the motor 35. Thus, it will be apparent that the operation of the switch is automatic and the motor is automatically stopped upon the completion of the slicing of a loaf and is automatically started when the follower is moved to permit of the insertion of a loaf in advance thereof.

The machine may be arranged to operate successively upon a plurality of loaves in which case, the follower is not employed to feed the loaves to the knives since the weight of the loaves themselves is sufficient to effect a feeding of the loaf being operated upon, through the cutting knives.

In Figures 1, 2 and 3, the machine is shown as operating successively upon a plurality of loaves B.

In this form of the machine a loaf feeding chute is provided through which the loaves are successively fed to the machine. This loaf feeding chute comprises a plate-like member 100 upon which are mounted by means of pivotal links 101, two walls 102. The walls 102 are parallel with each other and may be adjusted towards and away from each other by loosening a suitable fastening means 103 by which the links 101 are attached to the plate 100. This construction permits of adjustment of the walls 102 relatively to each other to adapt the loaf feeding chute to loaves of various lengths. Carried by the loaf feeding chute, there are two rigid arms 104 and these arms are received in strap-like brackets 105 carried by the side walls of the machine, the arms 104 being secured in the brackets by set screws or the like 106. This construction provides means for attachment of the loaf feeding chute to the machine and to aid in supporting the same, there may be a prop 107 which is preferably hinged as at 108 to the underside of the loaf feeding chute. The lower end of the prop may rest upon a suitable support 109 carried by the rear wall of the housing.

In attaching the loaf feeding chute to the machine, the operating lever 70 is rocked in a clockwise direction to move the follower to the extreme upper portion of the loaf supporting means 19. After the follower has been moved to the upper portion of the loaf supporting means, the nuts 61 are removed from the bolts 60 which will permit swinging of the follower about its pivotal points to a position where the handle 50 thereof engages the outer surface of the rear wall of the housing as illustrated in Figure 1. In this position the follower is not in the path of travel of the loaf to the machine and the follower is maintained in this position by engagement of the handle 50 with the rear wall of the machine as above described.

When the machine is operating successively upon a plurality of loaves, the motor is maintained in constant operation by reason of the fact that the arm 97 will engage the snap switch 99 as illustrated in Figure 1 of the drawings.

From the foregoing it will be apparent that the present invention provides a machine in which by reason of the fact that each of the knives is engaged by a guard or finger closely adjacent the point where the knife engages the loaf, should distortion of a knife occur during the cutting operation, damage to or breakage of the knives is thereby eliminated.

Furthermore, the guards or fingers being independently operated, insure their engagement with the loaf throughout the length thereof during the cutting operation.

It also becomes apparent that the present machine provides for feeding the loaf through the cutting knives mechanically, thus rendering it unnecessary for an operator to handle or manipulate the loaf during the cutting operation.

Furthermore, the present invention provides a machine which may be adapted at will to the cutting of single loaves at intermittent intervals or continuous operation successively upon a plurality of loaves.

Having thus described the invention, what is claimed as new, is:

1. A slicing machine comprising an inclined loaf supporting surface for supporting a loaf of bread to be sliced, slicing knives for severing the loaf into slices, a gravitationally movable element on the said loaf supporting surface for forcing the loaf through the slicing knives, a pivotally mounted member engageable with the loaf to support the loaf, a plurality of fingers arranged between the knives and engageable with the loaf during cutting operation, and means for returning the gravitationally movable member away from the knives.

2. In a bread slicing machine, a loaf supporting means, a plurality of spaced knives for cutting a loaf of bread into slices or sections, means movable to loaf engaging position between said knives for preventing distortion of the knives during a cutting operation, pusher means for normally moving said loaf past said knives, and additional means mounted for movement towards and away from the loaf supporting means and movable into pressing engagement with an upper portion of said loaf rearwardly of said first loaf engaging means and ahead of said pusher means to hold the loaf in position during at least a portion of the cutting operation.

3. In a bread slicing machine, an inclined loaf supporting means, a plurality of cutting elements, gravity actuated means mounted on said inclined loaf supporting means and normally movable thereon for feeding a loaf of bread into cutting relation with said cutting elements, and manually operable means independently mounted beneath said loaf supporting means for returning said gravitational feed means along said supporting means to an upper position on the supporting means after a cutting operation.

4. In a bread slicing machine, an inclined loaf supporting means, a plurality of cutting elements, gravity actuated means mounted on said inclined loaf supporting means and normally movable thereon for feeding a loaf of bread into cutting relation with said cutting elements, manually rotatable means independently mounted on the slicing machine, and means normally connecting said rotatable means to said gravity actuated feed means to effect return of said gravity actuated feed means along said supporting means to an upper position on the supporting means after a cutting operation and upon operation of said rotatable means.

5. In a bread slicing machine, an inclined loaf supporting means, a plurality of cutting elements, gravity actuated means mounted on said inclined loaf supporting means and normally movable thereon for feeding a loaf of bread into cutting relation with said cutting elements, manually rotatable means independently mounted on the slicing machine, means normally connecting said rotatable means to said gravity actuated feed means to effect return of said gravity actuated feed means along said supporting means to an upper position on the supporting means after a cutting operation and upon operation of said rotatable means, and means providing for detaching said feed means from said connecting means and moving the feed means to an inoperative position.

6. In a bread slicing machine, an inclined loaf supporting means, a plurality of cutting elements, pivoted means connected to a part of the machine and arranged adjacent the supporting means for engagement with the loaf to retain the same in position upon the inclined loaf supporting means, movable loaf feeding means for moving a loaf along the inclined loaf supporting means into cutting relation with said cutting elements, manually operable means operably connected to the loaf feeding means and adapted, when operated, to return said loaf feeding means to the upper portion of the loaf supporting means after a cutting operation has been completed, and means on said feeding means cooperating with means on said loaf holding means for elevating the pivoted loaf holding means to a position providing for the placement of a loaf to be cut simultaneously with the movement of the loaf feeding means to the upper portion of the loaf supporting means.

7. In a bread slicing machine, an inclined loaf supporting means, a plurality of cutting elements, movable loaf feeding means for moving a loaf to be cut along the inclined loaf supporting means into cutting relation with said cutting elements, manually operated mechanical means for returning the loaf feeding means to the upper portion of the inclined loaf supporting means after a cutting operation has been completed, a pivotally mounted means arranged above the supporting means and adapted to rest upon a loaf to retain the same upon the loaf supporting means, said pivoted loaf holding means overlying the loaf feeding means, and means on said feeding means cooperating with means on said overlying loaf holding means for elevating the holding means in response to return movement of the feeding means to the upper portion of the loaf support to raise the holding means to an elevated position providing for placement of a loaf upon the loaf supporting means.

8. A bread slicing machine comprising a loaf supporting surface, a plurality of spaced knives for cutting the loaf of bread into slices, a first loaf engaging means movable into engagement with upper portions of said loaf between said knives to hold the loaf on said surface during slicing thereof, a second loaf engaging means mounted for movement towards and away from the loaf supporting means and movable into engagement with an upper portion of said loaf rearwardly of said first means to press a rear portion of the loaf downwardly against said supporting surface and to maintain the loaf against rocking during at least a portion of a slicing operation, and means including a pusher member movable beneath said second loaf engaging means for moving a loaf past said knives.

MORRIS BRUSTOWSKY.